United States Patent
Völpel

[19]

[11] Patent Number: 5,862,893
[45] Date of Patent: Jan. 26, 1999

[54] FLUID STRUT FOR A MOTOR VEHICLE

[75] Inventor: Stefan Völpel, Koblenz, Germany

[73] Assignee: Stabilus GmbH, Koblenz, Germany

[21] Appl. No.: 719,550

[22] Filed: Sep. 25, 1996

[30] Foreign Application Priority Data

Sep. 26, 1995 [DE] Germany .............................. 19535711.6

[51] Int. Cl.$^6$ ....................................................... F16F 9/02
[52] U.S. Cl. ............................................ 188/276; 188/300
[58] Field of Search .................................... 188/276, 277, 188/278

[56] References Cited

U.S. PATENT DOCUMENTS

| 4,785,921 | 11/1988 | Hosan et al. ............................ 188/276 |
| 4,988,081 | 1/1991 | Dohrmann ............................... 188/276 |

FOREIGN PATENT DOCUMENTS

| 0291469 | 11/1988 | European Pat. Off. . |
| 2457938 | 6/1976 | Germany . |
| 3812552 | 11/1989 | Germany . |
| 4101567 | 7/1992 | Germany . |
| 4216573 | 11/1993 | Germany . |
| 4236961 | 5/1994 | Germany . |
| 61-291216 | 12/1986 | Japan . |
| 2164118 | 3/1988 | United Kingdom ................... 188/276 |

Primary Examiner—Matthew C. Graham
Attorney, Agent, or Firm—Nils H. Ljungman and Associates

[57] ABSTRACT

Fluid strut which consists of a cylinder, the interior of which contains a charge under pressure, and a piston rod connected to a piston located in this interior. On the end of the cylinder where the piston rod exits, there are a gasket and a guide for the piston rod, while a valve device which acts when there is a thermal overload on the fluid strut opens the interior to the atmosphere, whereby the valve device has at least one passage channel which can connect the atmosphere to the interior, whereby the fluid strut is connected by means of connecting parts to a base body and to a pivoting body which can move with respect to the base body, whereby in a first series connection between the base body by means of a first connecting part and the fluid strut, or a second series connection between the pivoting body by means of a second connecting part and the fluid strut, there is an element which melts in the event of a fire, and releases at least one end of the fluid strut from one of the series connections, as a result of which the fluid strut assumes a first emergency operating extended position, from which, in the event of the further addition of heat, the fluid strut moves into a second emergency operating extended position, in which the gasket to the piston rod is bridged.

20 Claims, 6 Drawing Sheets

FLUID STRUT FOR A MOTOR VEHICLE

BACKGROUND OF THE INVENTION

1. Field of the Invention

The present invention relates to a fluid strut for a motor vehicle. The fluid strut includes a cylinder and a piston rod connected to a piston. The piston is contained in the interior of the cylinder, which also contains a charge under pressure. The end of the cylinder which contains the exit for the piston rod contains a gasket and a guide rod for the piston rod. The cylinder also contains a valve device which acts when there is a thermal overload on the actuator element to open a passage channel which connects the interior of the cylinder to the atmosphere.

2. Background Information

German Laid Open Patent Application No. 41 01 567.3, for example, describes a known similar fluid strut. Attempts to reduce the risk represented in the event of a fire by the actuator element in the device described in the above-referenced unexamined patent application have led to good results. This problem must frequently be dealt with in relation to applications in motor vehicles in particular.

OBJECT OF THE INVENTION

The object of the present invention is to realize an improved fluid strut which minimizes the risk relating to a fluid strut in the event of a fire.

SUMMARY OF THE INVENTION

The present invention teaches that this object can be accomplished by connecting the fluid strut by a first connecting part to a base body and by a second connecting part to a pivoting body, with the pivoting body being movable with respect to the base body. Located in one of the connections is an element which melts in the event of a fire, and in such event would release one end of the actuator cylinder from one of the series connections, at which point the actuator element would assume a first emergency operating position. In the event of further application of heat, the actuator element can move into a second emergency operating position which bridges the gasket to the piston rod.

At least one end of the fluid strut, or actuator element can be very deliberately allowed to break out of its anchorage, as a result of which there can be a rapid decrease in pressure inside the actuator element merely as a result of the related extension movement of the piston rod. As one possibility, one connecting part or even the entire pivoting body or the base body itself can preferably be made of a thermoplastic material which has an appropriately low melting temperature. The force which causes it to break away can be provided by the pressurized charge in the actuator element. If even more heat is added, however, and the temperature in the actuator element continues to increase, the actuator element can bridge the gasket of the piston rod, in which case the gasket itself need not be destroyed.

The present invention also teaches that in the area covered by the stroke between the first and the second emergency operating extended position, there can be a stop which is preferably made of a meltable material. The addition of heat which acts on the free actuator element results in the melting of the stop, which makes it possible for the piston rod to be extended even further.

The present invention teaches that it is advantageous if the stop is formed by a sleeve. A part in the form of a sleeve is easy to handle. In addition, it is possible to maintain the axial installation direction which is frequently used for actuator elements. It is also advantageously possible to have the sleeve under a radial bias with respect to the inner wall of the cylinder, which fixes it in position in the actuator element.

With regard to a particularly simple construction and with an eye towards a small number of simple parts, the passage channel can be formed by a narrowing inside the piston rod. In the second emergency operating position, the narrowing overlaps the piston rod gasket, thereby bridging the piston rod gasket.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The present invention is explained in greater detail below with reference to the embodiments illustrated in the accompanying figures.

DESCRIPTION OF THE PREFERRED EMBODIMENT

Figure 3:
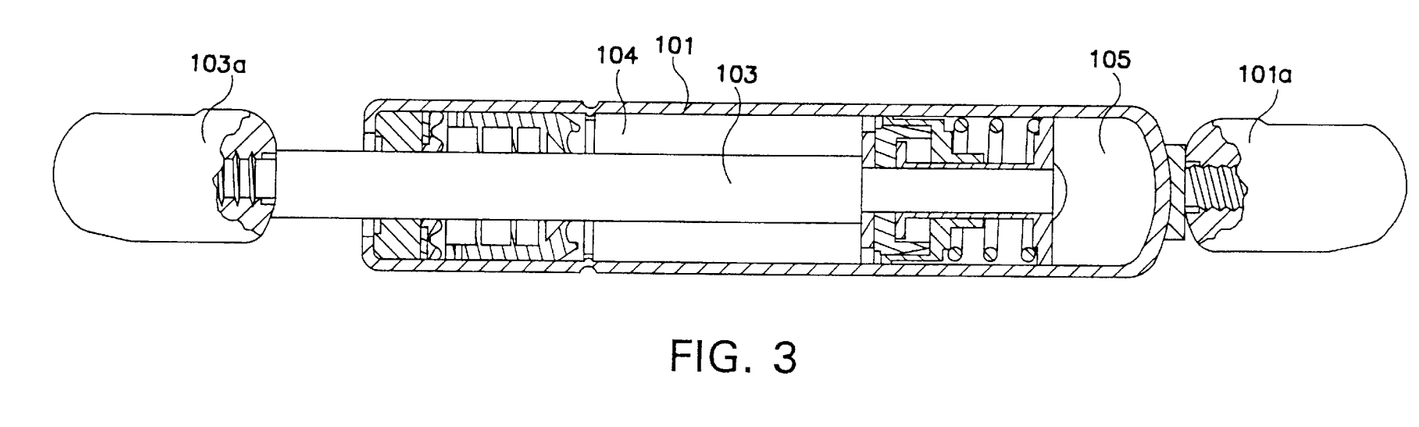
FIGS. 3, 3a, 3b and 3c show an additional embodiment of an actuator element having a hollow cylinder, a piston rod and an exchange device in cross section.
Figure 3A:
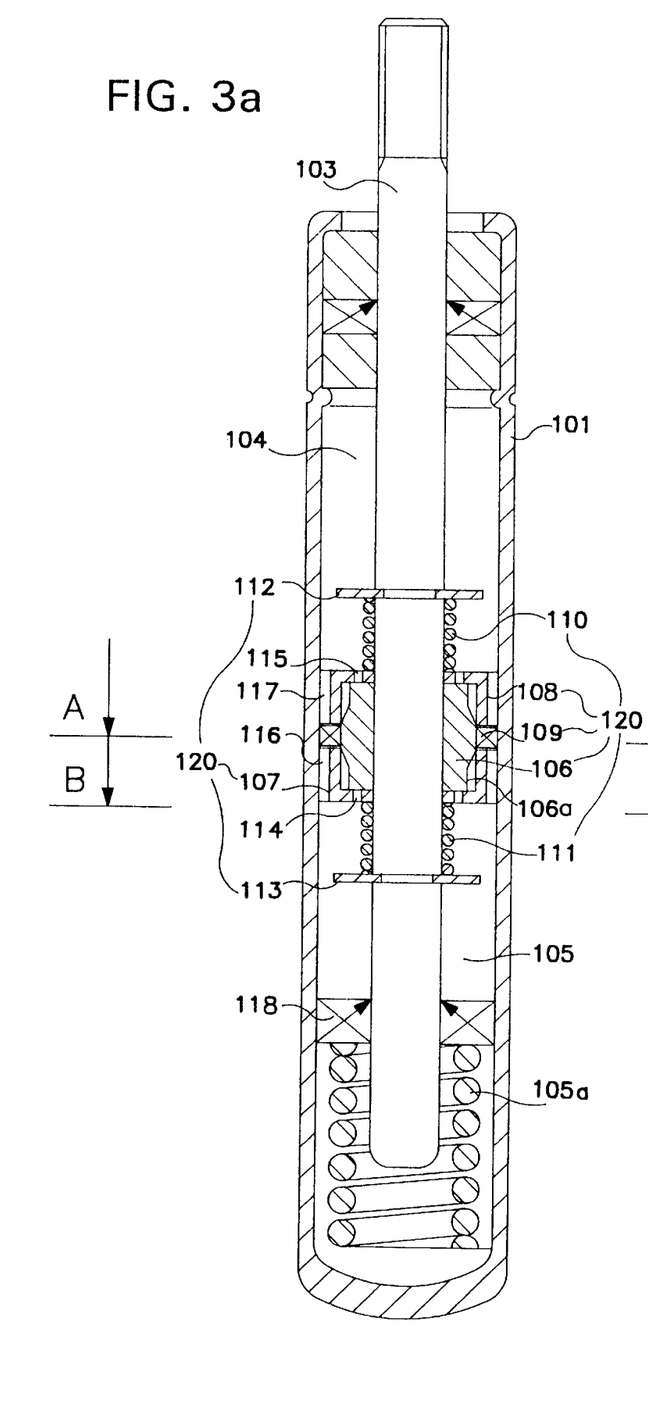
Figure 3B:
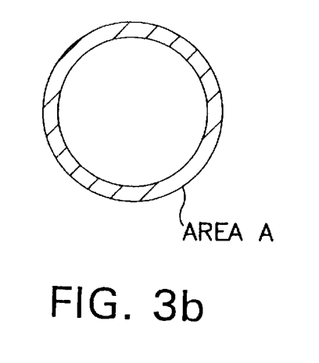
Figure 3C:
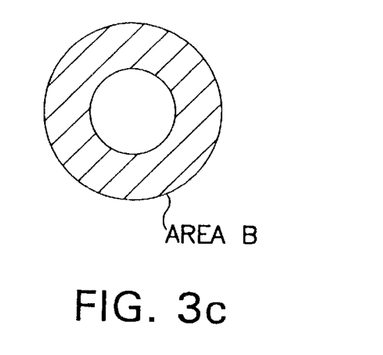
Figure 4:
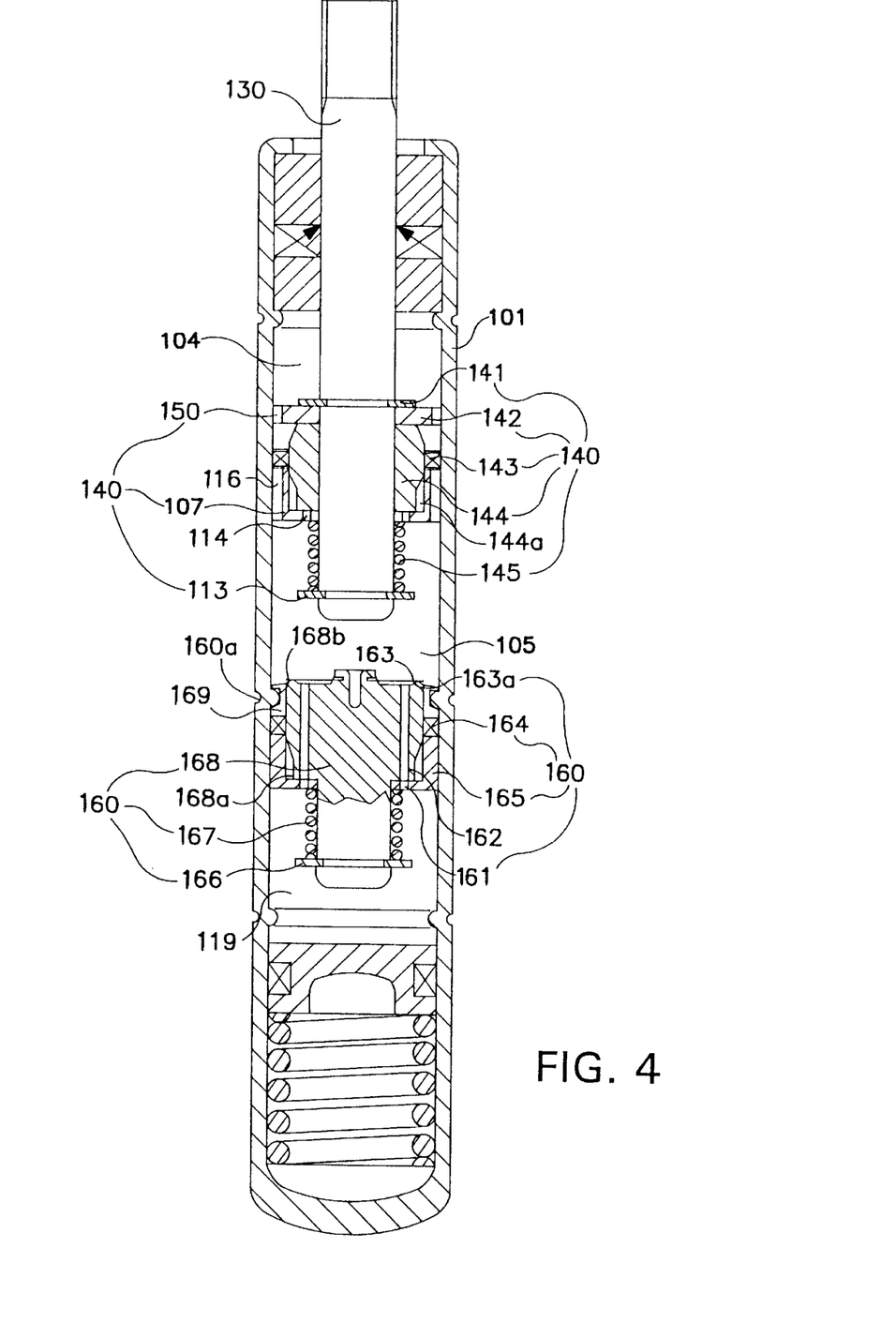
FIG. 4 shows another additional embodiment of an actuator element which differs in certain details from the embodiment of FIG. 3.
Figure 5:
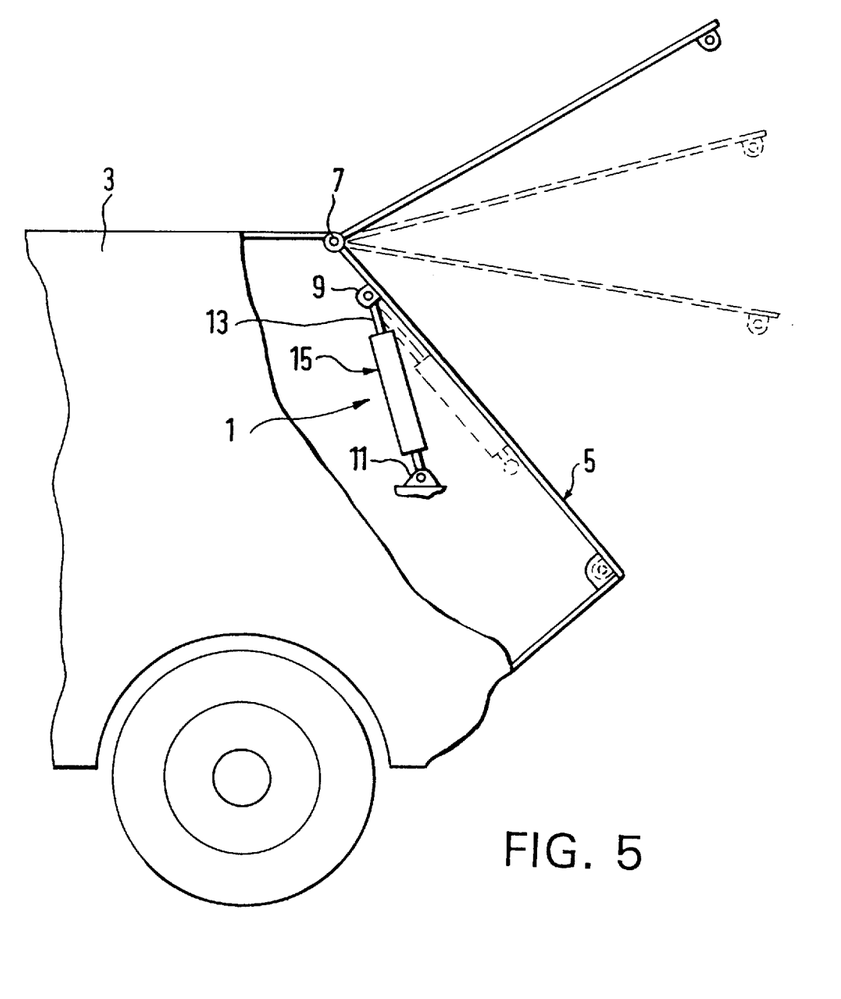
FIG. 5 shows an actuator element in an application in a motor vehicle.

We refer now to FIGS. 1–6. FIG. 5 is a schematic illustration of an actuator element 1 as it is used in a motor vehicle 3, whereby the actuator element 1 is realized in the form of a gas-filled strut, which in this case acts as a lifter and moves a pivoting body 5, which is here realized in the form of a trunk lid, around an axis of rotation 7 of a base body 2, in this case a vehicle body, from a closed position into an open position, as illustrated by the intermediate positions of the trunk lid 5 indicated by the broken lines.

The actuator element 1 is clamped by means of a first connecting part 9 and a second connecting part 11 in two series connections between the base body 2 and the first connecting part 9, and between the pivoting body 5 and the second connecting part 11. The clamping force is the thrust provided by the pressurized charge inside the actuator element 1. The base body 2, the pivoting body 5 or at least one of first connecting part 9 and second connecting part 11 are made of a material which preferably has a low melting point, whereby partial segments of the base body 2 and the pivoting body 5 can also preferably be made of such a material.

When one of the above-mentioned components which has a low melting point is melted and its anchorage is eliminated, the gas strut 1 can be extended (see FIG. 5), in which case the gas strut 1 assumes a first emergency operating position, which first emergency operating position corresponds to the maximum extended position of an actuator element 1.

Figure 6:
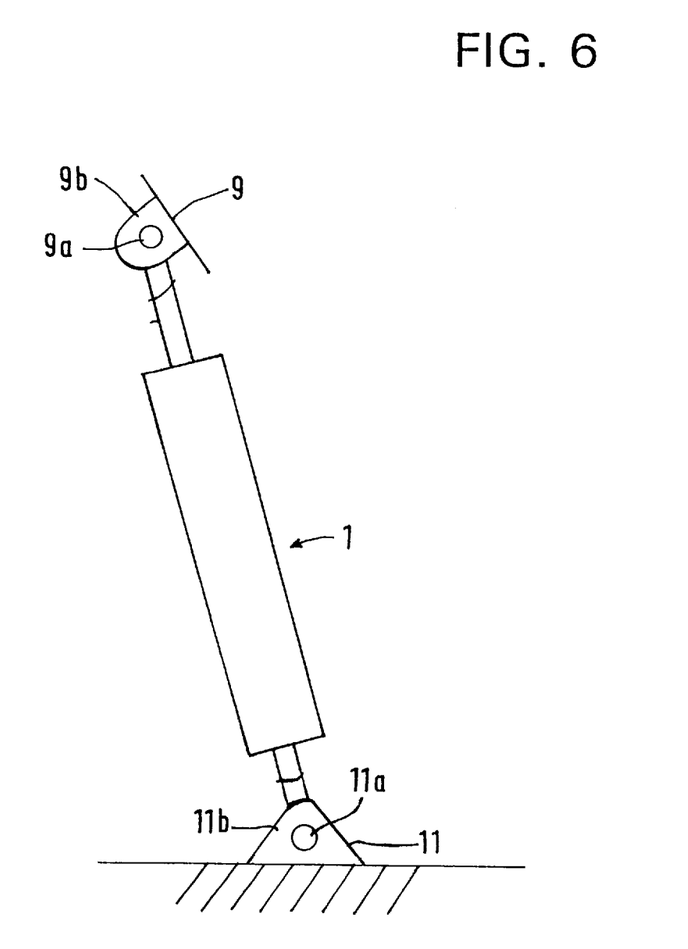
FIG. 6 shows a view of an actuator element and its connecting parts.

FIG. 6 shows an actuator element 1, its first connecting part 9 and second connecting part 11. The connecting parts 9;11 consist of pins 9*a;* 11*a* which fit into brackets 9*b,* 11*b*. Either at least one of pins 9*a* and 11*a* or at least one of brackets 9*b* and 11*b* of the connecting parts can be made of fusible material. One embodiment may be that at least one pin 9*a* or 11*a* could be made of a material which melts at a temperature substantially below the melting point of other solid components of the strut. Another embodiment may be that at least one bracket 9*b* or 11*b* could be made of a material which melts at a temperature substantially below the melting point of other solid components of the strut.

Figure 1:
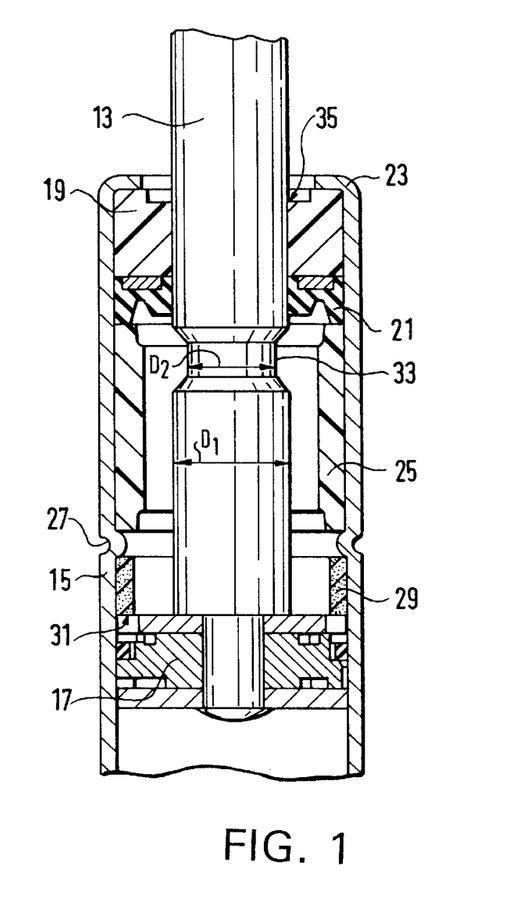
FIGS. 1 and 2 show an actuator element in cross section.
Figure 2:
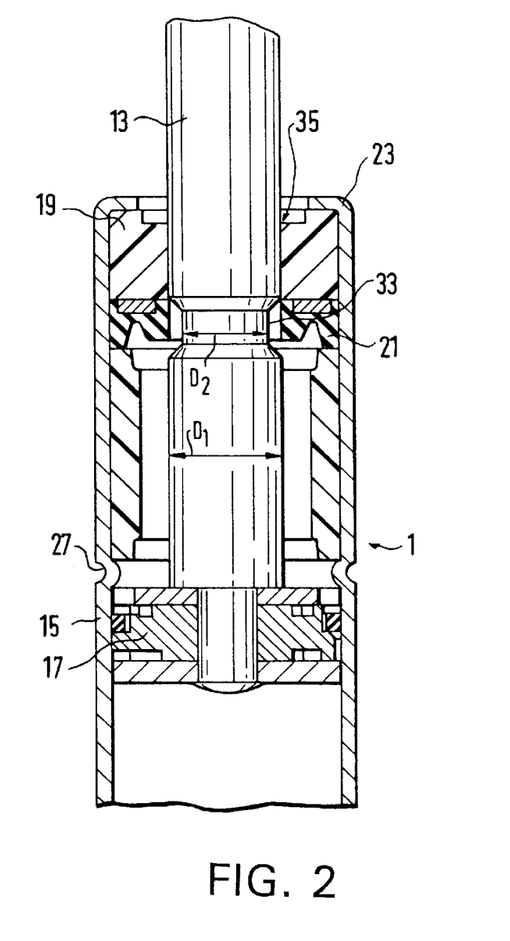

FIG. 1 is restricted to a cross section through the most important part of the actuator element 1. Inside a cylinder 15 there is the piston rod 13 with a piston 17, which piston rod 13 can move axially. A piston rod guide 19 centers the piston rod 13 with respect to the cylinder 15, whereby the piston rod guide 19 with a piston rod gasket 21 closes the cylinder 15 with respect to the atmosphere, whereby the cylinder 15 has a charge of gas under pressure. The piston rod guide 19 is supported on a crimped portion 23 of the cylinder 15, and forms a stop for the piston rod gasket 21, which performs a sealing function on its inside diameter and on its outside diameter. The piston rod guide 19 is in turn held by a fixing sleeve 25, the position of which is determined by an encircling bead 27, Below the bead 27, there is a sleeve 29 which acts as a stop and which has a bias with respect to the inside diameter of the cylinder 15, and is thus held radially and axially in its installed position. In normal operation, the piston 17 and the piston rod 13 are able to assume a maximum extended position which corresponds to the position illustrated in FIG. 1, i.e. when the piston 17 is in contact with an end surface 31 of the sleeve 29 which is opposite the bead 27. This same position is assumed when, as described above with reference to FIG. 5, as a result of thermal effects, a connecting piece 9; 11 is able to move freely, and the piston rod 13 is extended as a result of the pressurized charge.

As additional heat is added, the sleeve 29 melts away. Consequently, the piston rod 13 moves farther in the direction of extension. In that case, a narrow portion 33 of the piston rod 13, which narrows from a diameter D1 to a diameter D2, becomes active as it overlaps and thereby bridges the piston rod gasket 21. The result is a circular passage channel 35 between the interior of the actuator element 1 and the atmosphere, which reduces the pressure and thereby reduces the related extension force of the actuator element 1 (See FIG. 2).

FIG. 3 shows a hollow cylinder 101 which essentially defines an externally-sealed chamber therewithin. A piston rod 103 can preferably be disposed within the chamber, and the piston rod 10 can sealingly extend out of the cylinder 101.

The chamber can preferably be filled with a working fluid, liquid or gas, and can be divided into two separate working chambers 104 and 105 by a piston system 120, as shown in FIG. 3*a*. The piston system 120 can preferably be connected, on both sides thereof, to the piston rod 103. The piston system 120 preferably comprises a piston 106 which can advantageously be permanently connected, for example, by an adhesive, mechanical, interlocking or friction connection, to the piston rod 103, a sealing element 109, two parts 108 and 107 which can preferably move relative to the piston 106, two prestress elements 110 and 111, and two fixing elements 112 and 113 for positioning the prestress elements 110 and 111.

In the rest position of the arresting device, the parts 108 and 107 are preferably pushed against the piston 106 by the prestress elements 110 and 111. Thus, in the rest position, the sealing element 109 can be pushed into a defined position, in which the sealing element 109 preferably sealingly separates the working chambers 104 and 105. If, for example, tension is exerted on the piston rod 103 during a withdrawal or insertion of the piston rod 103, the separation or sealing of the working chambers 104, 105 by the sealing element 109 essentially results in an increase in pressure in one of the working chambers 104 or 105.

When the piston rod 103 is withdrawn out of the cylinder 101, there would essentially be an increase in pressure within the chamber 104. This increased pressure can be exerted, via a flow passage 117, preferably on the sealing element 109. The sealing element 109 can then preferably come into contact with the part 107, and an axial displacement force can thereby be exerted on the part 107. This axial displacement force preferably pushes the part 107 against the force of the opposing prestressing element 111. The part 107 can preferably be held in position by the prestress element 111, which prestress element 111 can preferably be, in turn, supported by the fixing element 113.

If, as a result of a sufficient tensile force on the piston rod 103, a pressure is generated in the working chamber 104 such that the axial displacement force of the seal element 109 (resulting from the pressure and the hydraulic cross section area A of the sealing element 109, see FIG. 3*b*) is greater than the support force of the prestressing element 111, the sealing element 109 can preferably push the part 107 axially away from the piston 106, thereby enabling the sealing element 109 to leave its sealing position. On account of the special contour of the piston 106, which contour can preferably be somewhat conical in at least one embodiment of the present invention, the sealing element 109 can lose its sealing function, so that working fluid can preferably flow from the working chamber 104 through the flow connection, or connections 117, and into the space 106*a* between the piston 106 and the part 107. The space 106*a* can preferably be connected to the working chamber 105 by means of a hole, or holes 114, thereby enabling flow of the fluid into the chamber 105.

Preferably after the working fluid has flowed into the space 106*a* and flowed into the working chamber 105 via the hole 114, the blocking pressure in the working chamber 104 will essentially be reduced to a low dynamic pressure. This low dynamic pressure, bearing on the larger hydraulic surface area B of the part 107, can preferably continue to hold the part 107 in the rearmost position, i.e. open.

As a result of the connection of the working chambers 104 and 105 by means of the flow connection 117 and the holes 114, it can be possible to position the piston 106 and thus the piston rod 103. A flow connection 116 can preferably be sealed in this position by the sealing element 109.

Therefore, after overcoming an initially high blocking force to initially move the piston rod 103, it can be possible to make the position adjustment by exerting only a slight adjustment force during the remaining movement of the piston rod 103.

If the movement of the piston rod 103 is stopped, there can then be a pressure equalization between the working chambers 104 and 105 so that no further opening force (resulting from the dynamic pressure and the resulting surface area B, see FIG. 3c) can be exerted on the sealing element 109. Then, preferably as a result of the force of the prestressing element 111, the part 107 can be pushed against the piston 106, and thus the sealing element 109 can be pushed back into its sealing position, whereupon the working chambers 104 and 105 can preferably again be separated from one another to retain the attained relative positioning between the piston rod 103 and the cylinder 101.

As a result of a special contour of the external surface of the piston 106, preferably in the axial direction of the piston 106, a soft, or smooth, transition can essentially be possible between blocking pressure and dynamic pressure. Thus, a smooth equalization of pressure can preferably be achieved between the blocking pressure and the dynamic pressure. In addition, on account of the friction between the sealing element 109 and the hollow cylinder 101, there can preferably be an essentially secure seal of the flow connections 116 and 117, depending on the direction of movement of the piston assembly 120 within the cylinder 101.

The sequence of operations described above essentially also takes place in the direction of insertion of the piston rod 103 into the cylinder 101, but now resulting in movement of the part 108 against the prestressing element 110. Thus, when the valve is open in an insertion operation, the working fluid can essentially flow from the working chamber 105 through the flow passage, or passages 116 and a hole, or holes 115 into the working chamber 104.

In a further feature of this embodiment of FIGS. 3 and 3a, a variable sealing element 118 can preferably be provided within the cylinder 101 to possibly externally seal and prestress the working chamber 105 (e.g. via a coil compression spring 105a, or gas cushion, etc.). Thus, during insertion and removal of the piston rod 103 into and out of the chamber 105, and when there is a change in temperature, it can preferably also be possible to allow for a volume equalization within the cylinder 101 when the working fluid is a liquid on account of the presence of the variable sealing element 118.

The sealing element 109 can preferably be an O-ring, a rectangular cross-section ring, or a specially-designed gasket with or without reinforcements, e.g. made of steel, plastic or rubber materials, or other sealing materials. The working fluid can preferably be any type of known liquid and/or gas media, such as oils and gases, which are commonly used for hydraulic and pneumatic cylinders.

In the embodiment as discussed above with reference to FIGS. 3 and 3a, the sealing element 109 is moved a substantial distance before the sealing engagement between the sealing element 109 and the piston 106 is lost. This distance that the sealing element 109 is moved can thereby possibly cause the positioning device to require that a greater force be applied before the flow connection opens, thereby possibly enabling the device to remain in its position even if bumped, or possibly subjected to a wind gust.

FIG. 4 illustrates an additional possible embodiment for varying the piston system so that a valve function can preferably be provided on a piston rod 130, by a piston system 140, and an additional valve function can preferably be provided by means of a partition arrangement, or valve system 160 in the hollow cylinder 101. This embodiment has the advantage that the arresting device can be shorter because of the elimination of a long piston rod 103 as is shown in FIG. 3.

If tension is exerted on the piston rod 130, i.e. to withdraw the piston rod 130, the piston system 140, preferably located on the piston rod 130, can be used and can essentially operate in the same manner as the valve assembly 120 described with reference to FIG. 3a. As such, the pressure in chamber 104 can press on a sealing member 143, to press the part 107 against the force of a prestressing element 145 which is preferably positioned by means of fixing element 113. Upon displacement of the sealing member 143 axially out of its sealing position about a piston 144, the fluid from chamber 104 can preferably flow into the a space 144a, between the piston 144 and the part 107, and then into chamber 105, via the hole 114. Simultaneously, since the piston rod 130 is being withdrawn from the cylinder, the volume space occupied by the piston rod 130 becomes less. This volume space can preferably be filled with working fluid which can flow from a chamber 119 via flow holes 161 and 162 into the working chamber 105.

In this flow direction, valve plates 163, preferably located on the valve system 160, preferably are configured so that there will essentially not be a blocking of the fluid flow. For this purpose, the valve plates 163 can be configured to simply lift away from a corresponding valve seat portion 163a, and thus open the passage. In this embodiment of FIG. 4, the valve system 160 can be maintained in place within the cylinder 101, preferably by means of an impression 160a into the cylinder 101, which impression 160a can preferably engage a notch 168b of a valve body 168.

If a force is exerted on the piston rod 130 in the compression directions a pressure can build up in the working chamber 105. This increased pressure in the chamber 105 can lead to an actuation of the valve system 160 preferably located in the hollow cylinder. In essence, the valve system 160 can preferably have similar components to the valve system 140, and can thereby, like valve system 140, essentially function according to the same principle as the valve system 120 illustrated in FIG. 3a. As such, fluid can flow through a passage 169, and the pressure of the fluid can press onto a sealing member 164, to press a part 165 against the force of a prestressing element 167 which is positioned by means of a fixing element 166. Upon displacement of the sealing member 164 axially out of its sealing position about valve body 168, the fluid from chamber 105 can preferably flow into the space 168a, between the valve body 168 and the part 165, and then into chamber 119, via the hole 161, Simultaneously, the pressure in the working chamber 105 can cause the sealing element 143 to be pushed out of its sealing position, away from the part 107 and against a plate 142, which sealing plate 142 can be fixed in position between the piston 144 and a fixing member 141. Thus, the working fluid can flow from the working chamber 105 via the flow connection 116 and 150 into the working chamber 104.

The above discussed sequence of motions can essentially be controlled exclusively by the valve system 160 located in the hollow cylinder 101.

If the movement of the piston rod 130 is stopped, there can be a pressure equalization between the working chamber 105 and the chamber 119, so that there will essentially no longer be an opening force generated on the sealing element 164. As a result of the force of the prestressing element 167, the part 165 can then be pressed against the valve body 168, and thus the sealing element 164 can preferably be pushed into its sealing position, The apparatus can thus be blocked in the compression direction of the piston rod 103. In the decompression direction, that is, if pulling tension were exerted to withdraw the piston rod 130, the sealing element 143, on account of the pressure in the working chamber 104 would essentially immediately be pushed into the sealing position. Thus, in this decompression direction, too, on account of the friction of the sealing element 143 on the hollow cylinder 101, the arresting device would preferably be blocked.

In summary, the present invention relates to an actuator element for a gas cylinder for use in applications such as a lifter for an automobile hood or trunk lid or rear hatch. The actuator element includes a cylinder and a piston rod connected to a piston. The piston is contained in the interior of the cylinder, which also contains a charge under pressure. The end of the cylinder which contains the exit for the piston rod contains a gasket and a guide rod for the piston rod. The cylinder also contains a valve device which acts when there is a thermal overload on the actuator element to open a passage channel which connects the interior of the cylinder to the atmosphere.

To recapitulate, an actuator element for use in applications such as a lifter for an automobile hood, trunk or rear hatch, contains cylinder, the interior of which contains a charge under pressure, and a piston rod connected to a piston located in this interior. On the end of the cylinder where the piston rod exits, there are a gasket and a guide for the piston rod, while a valve device which acts when there is a thermal overload on the actuator element opens the interior to the atmosphere, whereby the valve device has at least one passage channel which can connect the atmosphere to the interior, whereby the actuator element is connected by means of connecting parts to a base body and to a pivoting body which can move with respect to the base body, whereby in a first series connection between the base body by means of a first connecting part and the actuator element, or a second series connection between the pivoting body by means of a second connecting part and the actuator element, there is an element which melts in the event of a fire, and releases at least one end of the actuator cylinder from one of the series connections, as a result of which the actuator element assumes a first emergency operating extended position, from which, in the event of the further addition of heat, the actuator element moves into a second emergency operating extended position, in which the gasket to the piston rod is bridged.

An object of the present invention is to realize an improved actuator element which minimizes the risk relating to an actuator element in the event of a fire.

One feature of the invention resides broadly in the actuator element which consists of a cylinder, the interior of which contains a charge under pressure, and a piston rod connected to a piston located in this interior, whereby on the end of the cylinder where the piston rod exits, there are a gasket and a guide for the piston rod, while a valve device which acts when there is a thermal overload on the actuator element opens the interior to the atmosphere, whereby the valve device has at least one passage channel which can connect the atmosphere to the interior, characterized by the fact that the actuator element 1 is connected by means of connecting parts 9; 11 to a base body 3 and to a pivoting body 5 which can move with respect to the base body, whereby in a first series connection between the base body by means of a first connecting part 9 and the actuator element, or a second series connection between the pivoting body by means of a second connecting part 11 and the actuator element, there is an element which melts in the event of a fire, and releases at least one end of the actuator cylinder from one of the series connections, as a result of which the actuator element assumes a first emergency operating extended position, from which, in the event of the further addition of heat, the actuator element moves into a second emergency operating extended position, in which the gasket to the piston rod is bridged.

Another feature of the invention resides broadly in the actuator element characterized by the fact that in the range of stroke movement between the first and the second emergency operating extended positions, there is a stop 29 which is made of a material which melts.

Yet another feature of the invention resides broadly in the actuator element characterized by the fact that the stop is formed by a sleeve.

Still another feature of the invention resides broadly in the actuator element characterized by the fact that the sleeve is under a radial bias with respect to the inner wall of the cylinder 15.

A further feature of the invention resides broadly in the actuator element characterized by the fact that the passage channel 35 is formed by a narrowing 33 in the piston rod.

The U.S. patent application, Ser. No. 08/341,502 now U.S. Pat. No. 5,568,456, filed Nov. 17, 1994, titled "A Hydraulic Strut for a Motor Vehicle", with the inventors K. Koch and H. Heinrichs, attorney docket number NHL-FIS-82-(STAB), are hereby incorporated by reference as if set forth in their entirety herein.

U.S. Pat. No. 4,988,081, issued to Dohrmann, and assigned to Boge AG, are hereby incorporated by reference as if set forth in their entirety herein.

The corresponding foreign patent publication applications, namely, Federal Republic of Germany Patent Application No. 195 35 711.6 filed on Sep. 26, 1995, having inventor Stefan Völpel, and DE-OS 195 35 711.6 and DE-PS 195 35 711.6, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A fluid strut for a motor vehicle, said fluid strut comprising:

a cylinder;

said cylinder having a first axial end and a second axial end;

a pressurized fluid disposed in said cylinder;

first apparatus to connect said second end of said cylinder to a first object;

a piston rod;

said piston rod comprising a first end and a second end;

a piston;

said piston being connected to said first end of said piston rod;

said piston being disposed within said cylinder;

said second end of said piston rod extending out of said first end of said cylinder;

second apparatus to connect said second end of said piston rod to a second object;

said fluid strut having a first range of motion under normal operating conditions;

said first and second objects having a first range of relative motion;

structure to permit additional relative motion of said first object with respect to said second object;

said additional motion permitting structure comprising a first material having a first melting point temperature;

said first material comprising a material which melts at a temperature substantially lower than the melting temperature of other solid portions of said strut to permit said first object to move further away from said second object upon occurrence of fire in the motor vehicle;

said first range of motion under normal operating conditions comprising motion of said strut at a temperature substantially less than said first melting point temperature;

said first connecting apparatus comprising a first connecting part;

said second connecting apparatus comprising a second connecting part;

one of said first and second connecting parts comprising said first material;

structure to further extend said piston rod upon application of additional heat to said strut; and said further extending structure comprising a second material configured to react under conditions different from said first material to permit said fluid to be released from said cylinder upon further application of heat to said strut.

2. The strut according to claim 1 wherein:

said second material has a second melting point temperature; and said second material comprises a material which melts at a temperature substantially higher than the melting temperature of said first material and substantially lower than the melting temperature of other solid portions of said strut.

3. The fluid strut as claimed in claim 2 wherein:

said cylinder comprises a stop;

said stop is disposed within said cylinder;

said stop is disposed to limit the extension of said strut; and said stop comprises said second material.

4. The fluid strut as claimed in claim 3 wherein:

said cylinder comprises an inner wall;

said stop comprises a sleeve; and said sleeve is biased against said inner wall of said cylinder.

5. The fluid strut as claimed in claim 4 comprising:

a valve to release said pressurized fluid to the atmosphere upon occurrence of fire in the motor vehicle; and said valve comprising:
 a passage channel open to the atmosphere; and
 apparatus to open said passage channel to said pressurized fluid upon occurrence of fire in the motor vehicle.

6. The fluid strut as claimed in claim 5 comprising:

a piston rod gasket;

said piston rod gasket having an inner diameter;

said piston rod having a longitudinal axis;

said piston rod having a diameter defined transverse to the longitudinal axis of said piston rod; and said piston rod comprising a region having a diameter substantially less than said inner diameter of said piston rod gasket.

7. The fluid strut as claimed in claim 6 wherein:

said opening apparatus comprises said region of said piston rod; and said opening apparatus comprises said further extending structure.

8. A fluid strut for a motor vehicle, said fluid strut comprising:

a cylinder;

said cylinder having a first axial end and a second axial end;

first means for connecting said second end of said cylinder to a first object;

a piston rod;

said piston rod comprising a first end and a second end;

a piston;

said piston being connected to said first end of said piston rod;

said piston being disposed within said cylinder;

said second end of said piston rod extending out of said first end of said cylinder;

second means for connecting said second end of said piston rod to a second object;

said strut having a first range of motion under normal operating conditions;

said first and second objects having a first range of relative motion;

means for permitting additional relative motion of said first object with respect to said second object;

said additional motion permitting means comprising a first material having a first melting point temperature;

said first material comprising a material which melts at a temperature substantially lower than the melting temperature of other solid portions of said strut to permit said first object to move further away from said second object upon occurrence of fire in the motor vehicle;

said first range of motion under normal operating conditions comprising motion of said strut at a temperature substantially less than said first melting point temperature;

said first connecting means comprising a first connecting part;

said second connecting means comprising a second connecting part;

one of said first and second connecting parts comprising said first material;

means for further extending said piston rod;

said further extending means comprising a second material having a second melting point temperature; and said second material comprising a material which melts at a temperature substantially higher than the melting temperature of said first material and substantially lower than the melting temperature of other solid portions of said strut.

9. The fluid strut as claimed in claim 8 wherein:

said cylinder comprises a stop;

said stop is disposed within said cylinder;

said stop is disposed to limit the extension of said strut; and said stop comprises said second material.

10. The fluid strut as claimed in claim 9 wherein:

said cylinder comprises an inner wall;

said stop comprises a sleeve; and said sleeve is biased against said inner wall of said cylinder.

11. The fluid strut as claimed in claim 10 comprising:

a pressurized fluid;

said pressurized fluid being disposed within said cylinder;

valve means for releasing said pressurized fluid to the atmosphere upon occurrence of fire in the motor vehicle; and said valve means comprising:

a passage channel open to the atmosphere; and means for opening said passage channel to said pressurized fluid upon occurrence of fire in the motor vehicle.

12. The fluid strut as claimed in claim 11 comprising:

a piston rod gasket;

said piston rod gasket having an inner diameter;

said piston rod having a longitudinal axis;

said piston rod having a diameter defined transverse to the longitudinal axis of said piston rod; and said piston rod comprising a region having a diameter substantially less than said inner diameter of said piston rod gasket.

13. The fluid strut as claimed in claim 12 wherein:

said opening means comprises said region of said piston rod; and said opening means comprises said means for further extending said piston rod.

14. A fluid strut comprising:

a cylinder;

said cylinder having a first axial end and a second axial end;

a pressurized fluid disposed within said cylinder;

a first apparatus to connect said second end of said cylinder to a first object;

a piston rod;

said piston rod comprising a first end and a second end;

a piston;

said piston being connected to said first end of said piston rod;

said piston being disposed within said cylinder;

said second end of said piston rod extending out of said first end of said cylinder;

a second apparatus to connect said second end of said piston rod to a second object;

said strut having a first range of motion under normal operating conditions;

said first and second objects having a first range of relative motion;

structure to permit additional relative motion of said first object with respect to said second object;

said additional motion permitting structure comprising a first material having a first melting point temperature;

said first material comprising a material which melts at a temperature substantially lower than the melting temperature of other solid portions of said strut to permit said first object to move further away from said second object upon occurrence of fire in the motor vehicle;

said first range of motion under normal operating conditions, not in the occurence of fire in the motor vehicle, comprising motion of said strut at a temperature substantially less than said first melting point temperature;

said first connecting apparatus comprising a first connecting part;

said second connecting apparatus comprising a second connecting part;

one of said first and second connecting parts comprising said first material;

a gasket;

said gasket being disposed within said cylinder;

said gasket being disposed about said piston rod;

said gasket being disposed and configured to maintain pressure within said cylinder;

said piston rod comprising a region;

said region of said piston rod being configured to straddle said gasket;

said region of said piston rod comprising structure to allow said fluid to be released from said cylinder upon further application of heat to the strut;

structure to further extend said piston rod to an emergency extended operating position; and said structure to further extend said piston rod being configured to permit said region of said piston rod to be disposed adjacent said gasket to permit said fluid to be released from said cylinder through said structure to allow said fluid to be released from said cylinder upon further application of heat to the strut.

15. The fluid strut as claimed in claim 14 wherein:

said further extending structure comprises a second material having a second melting point temperature; and said second material comprises a material which melts at a temperature substantially higher than the melting temperature of said first material and substantially lower than the melting temperature of other solid portions of said strut.

16. The fluid strut as claimed in claim 15 wherein:

said cylinder comprises a stop;

said stop is disposed within said cylinder;

said stop is disposed to limit the extension of said strut; and said stop comprises said second material.

17. The fluid strut as claimed in claim 16 wherein:

said cylinder comprises an inner wall;

said stop comprises a sleeve; and said sleeve is biased against said inner wall of said cylinder.

18. The fluid strut as claimed in claim 17 comprising:

a valve to release said pressurized fluid to the atmosphere upon occurrence of fire in the motor vehicle; and said valve comprising:

a passage channel open to the atmosphere; and apparatus to open said passage channel to said pressurized fluid upon occurrence of fire in the motor vehicle.

19. The fluid strut as claimed in claim 17 wherein:

said piston rod gasket has an inner diameter;

said piston rod has a longitudinal axis;

said piston rod has a diameter defined transverse to the longitudinal axis of said piston rod; and said region of said piston rod has a diameter substantially less than said inner diameter of said piston rod gasket.

20. The fluid strut as claimed in claim 19 wherein:

said apparatus to open comprises said region of said piston rod; and said apparatus to open comprises said structure to further extend said piston rod.

* * * * *

UNITED STATES PATENT AND TRADEMARK OFFICE
CERTIFICATE OF CORRECTION

PATENT NO. : 5,862,893
DATED : January 26, 1999
INVENTOR(S) : Stefan VÖLPEL

It is certified that error appears in the above-identified patent and that said Letters Patent is hereby corrected as shown below:

In column 6, line 9, after 'into', delete "the".

In column 6, line 28, after 'pression', delete "directions" and substitute therefor --direction,--.

In column 12, line 53, Claim 19, after 'claim', delete "17" and substitute therefor --18--.

Signed and Sealed this

Twelfth Day of October, 1999

Attest:

Q. TODD DICKINSON

Attesting Officer     Acting Commissioner of Patents and Trademarks